(12) United States Patent
Amano

(10) Patent No.: US 9,267,825 B2
(45) Date of Patent: Feb. 23, 2016

(54) POINTER STRUCTURE

(71) Applicant: Yazaki Corporation, Tokyo (JP)

(72) Inventor: Mikiya Amano, Shimada (JP)

(73) Assignee: Yazaki Corporation, Tokyo (JP)

( * ) Notice: Subject to any disclaimer, the term of this patent is extended or adjusted under 35 U.S.C. 154(b) by 210 days.

(21) Appl. No.: 14/089,115

(22) Filed: Nov. 25, 2013

(65) Prior Publication Data

US 2014/0144368 A1    May 29, 2014

(30) Foreign Application Priority Data

Nov. 26, 2012    (JP) .................................. 2012-257941

(51) Int. Cl.
*G01D 13/22*    (2006.01)
*G01D 11/28*    (2006.01)

(52) U.S. Cl.
CPC .......... *G01D 13/22* (2013.01); *B60K 2350/408* (2013.01)

(58) Field of Classification Search
CPC ...... G01D 13/22; G01D 13/26; G01D 13/265
USPC ......... 116/284, 286, 287, 288, 328, 329, 330, 116/331, 332; 362/23.21; 368/238
See application file for complete search history.

(56) References Cited

U.S. PATENT DOCUMENTS

| | | | | |
|---|---|---|---|---|
| 3,142,148 | A * | 7/1964 | Morgan | G04B 19/042 116/332 |
| 5,630,373 | A * | 5/1997 | Kato | B60Q 3/044 116/286 |
| 2005/0109261 | A1 | 5/2005 | Tanaka et al. | |
| 2009/0056616 | A1 | 3/2009 | Yoshida | |
| 2010/0007509 | A1 * | 1/2010 | Ono | B60K 37/02 340/815.78 |
| 2011/0232563 | A1 * | 9/2011 | Ono | B60K 37/02 116/284 |
| 2011/0242790 | A1 | 10/2011 | Ono et al. | |
| 2012/0222612 | A1 | 9/2012 | Amano | |
| 2012/0264102 | A1 | 10/2012 | Ludewig et al. | |

FOREIGN PATENT DOCUMENTS

| | | | |
|---|---|---|---|
| CN | 101336363 A | 12/2008 | |
| CN | 102574460 A | 7/2012 | |
| CN | 102653234 A | 9/2012 | |
| CN | 102574460 B | 12/2014 | |
| JP | 2005181301 A | 7/2005 | |
| JP | 2010019619 A * | 1/2010 | ............. G01D 13/22 |
| JP | 2012052812 A * | 3/2012 | ............. G01D 13/04 |
| JP | 4977413 B2 | 7/2012 | |
| JP | 2012137462 A * | 7/2012 | ............. G01D 13/22 |

OTHER PUBLICATIONS

Office Action issued Oct. 10, 2015, issued by the State Intellectual Property Office of the People's Republic of China in counterpart Chinese Patent Application No. 201310611753.1.

* cited by examiner

*Primary Examiner* — R. A. Smith
(74) *Attorney, Agent, or Firm* — Sughrue Mion, PLLC

(57) ABSTRACT

A pointer structure including: a pointer main body having a pointer visualizing portion closer to a pointer tip and a pointer neck portion continuing to the pointer visualizing portion extending along from an edge region of a dial plate to a backside thereof; a main cover having a first sidewall having a bend piece portion covering an inner corner of the pointer bend portion and a second sidewall continuing to and confronting the first sidewall, having trough to sandwich the pointer main body; and a sub-cover having an L-shaped cover portion formed with a window through which the pointer visualizing portion is exposed and covering both side faces of the pointer visualizing portion, an outer corner of the pointer bend portion and both side faces of the pointer neck portion, wherein the L-shaped cover portion continues with a lid portion closing an opening between the first and second sidewalls.

2 Claims, 6 Drawing Sheets

POINTER STRUCTURE

CROSS REFERENCE TO RELATED APPLICATIONS

This application is based on and claims the benefit of Japanese Patent Application No. 2012-257941 filed on Nov. 26, 2012, the contents of which are incorporated herein by reference in its entirety.

BACKGROUND OF THE INVENTION

1. Technical Field

The present invention relates to a pointer structure.

2. Description of the Related Art

There is a known vehicular pointer device having a display, such as a liquid-crystal display (LCD), arranged in a center of a dial plate for a rotary pointer. In the case such a display is disposed frontward of a dial plate for the ordinary rotary pointer, the display can be laid out at or around a center of the dial plate without interfering a view of the display with the pointer.

However, in the case where the dial plate is to indicate important information such as vehicle speed and the display is to show comparatively less significant information such as current time or so, the dial plate is desirably disposed frontward of the display in a manner improving the visibility of the dial plate.

In the pointer device in a type as shown in FIGS. 5A and 5B, an LCD 610 is provided backward of the dial plate 600 formed thereon with an indicator showing, for example, vehicle speeds so that the LCD 610 backward is exposed through an aperture 601 formed in a center of the dial plate 600. Furthermore, the pointer device includes a pointer 620 for pointing an indicator on the dial plate 600, a circuit board 630 carrying electronic components thereon, and an internal mechanism 640 mounted on the circuit board 630 to rotate the pointer 620 (see Patent Document 1, for example).

The pointer 620 is provided extending along from the internal mechanism 640 to the back and main surfaces of the dial plate 600 through, in order, a backside of the LCD 610, an outer periphery of the LCD 610 and a gap between the LCD 610 and the dial plate 600. Namely, the pointer 620 is in a generally S-shape that is folded through between the dial plate 600 and the LCD 610. With this structure, the pointer 620 is not obstructive to a view of the LCD 610 despite the LCD 610 is disposed backward of the dial plate 600.

In the meanwhile, the pointer 620 desirably emits light spontaneously in order to improve the visibility. In this case, it can be contemplated that a plurality of LED light sources are provided on the circuit board 630 in a manner surrounding a rotation shaft of the internal mechanism 640 and, moreover, the pointer 620 has a pointer main body formed of a light transmissive material so that the light received from the light sources provided on the side of the internal mechanism 640 can be guided to a pointer visualizing portion located at a tip of the pointer main body. The pointer main body used in such a spontaneous light pointer device is structurally surrounded with a light-shielding cover in order to prevent light from leaking.

FIG. 6 is an essential-part exploded perspective view showing a reference example of a spontaneous light pointer whose pointer main body is surrounded by a cover.

The spontaneous light pointer shown in FIG. 6 is structured that a pointer main body 501 is coved by three members, i.e. a visualizing-portion cover 503, a main-body cover 505 and a lid cover 507.

The pointer main body 501 has a pointer visualizing portion 515 arranged extending along a surface of the dial plate 600 shown in FIGS. 5A and 5B, a pointer neck portion 513 continuing to the pointer visualizing portion 515 through a pointer bend portion 511 and extending along from an inner surface of the dial plate 600 to a backside thereof, and a U-shaped bend portion 514 continuing from the pointer neck portion closer to a pointer base end, so that a generally S-shape is formed at a tip of the pointer main body.

The visualizing-portion cover 503 is formed in a generally L-shape with a window 517 through which the pointer visualizing portion 515 is exposed. The main-body cover 505 has in a first sidewall 521 a bend piece portion 519 covering an inner corner of the pointer bend portion 511, and is formed in a trough form having a second sidewall 523 continuing to the first sidewall 521 through a bottom wall 525 in a manner sandwiching the pointer main body 501. The lid cover 507 closes the opening 527 spanning between the first sidewall 521 and the second sidewall 523.

According to this pointer structure, the pointer neck portion 513 and U-shaped bend portion 514 of the pointer main body 501 is housed in the main-body cover 505, the lid cover 507 is secured in the opening 527 of the main-body cover 505 and the visualizing-portion cover 503 is covered over the pointer visualizing portion 515 of the pointer main body 501, whereby light is prevented from leaking from the pointer main body 501.

RELATED ART LITERATURE

Patent Document

Patent Document 1: JP-2005-181301A

SUMMARY OF THE INVENTION

Problem That the Invention Is To Solve

However, the pointer structure of the reference example shown in FIG. 6 requires three members, i.e. the visualizing-portion cover 503, the main-body cover 505 and the lid cover 507, in order to cover the pointer main body 501.

This results in a problem that assembling efficiency is not well with an excessive number of parts. In addition, the visualizing-portion cover 503 and the main-body cover 505 and lid cover 507, that are provided separate, have their abutting faces 529 located frontward of the dial plate. This makes appearance deteriorated while causing the possibility of light leaks.

The present invention has been made in view of the above circumstances and aims at providing a pointer structure that can be assembled efficiently with a reduced number of parts and be improved in light-shielding characteristics and appearance.

Means for Solving the Problem

According to one aspect of the invention, there is provided a pointer structure comprising:

a pointer main body having a pointer visualizing portion arranged along a surface of a dial plate and provided closer to a pointer tip and a pointer neck portion continuing to the pointer visualizing portion through a pointer bend portion and extending along from an edge region of the dial plate to a backside thereof;

a main cover having a first sidewall having a bend piece portion covering an inner corner of the pointer bend portion and a second sidewall continuing to and confronting the first sidewall through a bottom wall, and formed in a trough form so that the first sidewall and the second sidewall sandwich the pointer main body in a region closer to a pointer base end than the pointer neck portion; and a sub-cover having an L-shaped cover portion formed with a window through which the pointer visualizing portion is exposed and covering both side faces of the pointer visualizing portion, an outer corner of the pointer bend portion and both side faces of the pointer neck portion, wherein the L-shaped cover portion continues with a lid portion closing an opening spanning between the first sidewall and the second sidewall.

According to the above pointer structure, the pointer main body can be covered by the two members, i.e. the main cover and the sub-cover, so that the number of parts can be reduced.

In addition, because the L-shaped cover portion is formed integral with the lid portion and moreover the L-shaped cover portion and the main cover have their abutting faces located in positions backward of the dial plate and closer to the pointer base end than the pointer neck portion, no leak of light occurs toward the main surface of the dial plate.

Furthermore, design improvement can be achieved by the reduced number of abutting faces.

Upon assembling onto the pointer main body, the main cover first receives the pointer main body and then the pointer visualizing portion is inserted into the L-shaped cover portion from below by bringing the L-shaped cover portion of the sub-cover thereto from obliquely above the bend piece portion. At the same time, the lid portion continuing with the L-shaped cover portion can be attached to the opening spanning between the first sidewall and the second sidewall. The sub-cover can be secured to the main cover by a one-directional assembling action.

The lid portion may be secured to the opening through a claw-engagement structure provided between the first and second sidewalls and the lid portion.

According to the above pointer structure, the pointer visualizing portion is inserted into the L-shaped cover portion from below and simultaneously the lid portion continuing with the L-shaped cover portion is attached to the opening spanning between the first sidewall and the second sidewall. On this occasion, the lid portion can be easily secured to the opening through the claw-engagement structure by pushing the lid portion onto the main cover while keeping a one-directional assembling action.

Advantage of the Invention

According to the pointer structure in the present invention, assembling is possible with efficiency by a reduced number of parts while improving light-shielding characteristics and appearance.

The present invention was briefly explained above. The details of the present invention will be further clarified by thoroughly reading Mode for Carrying Out the Invention (hereinafter, referred to as "embodiment") explained below with reference to the accompanying drawings.

MODE FOR CARRYING OUT THE INVENTION

Hereinafter, an embodiment according to the present invention will be explained with reference to the drawings.

Figure 1:
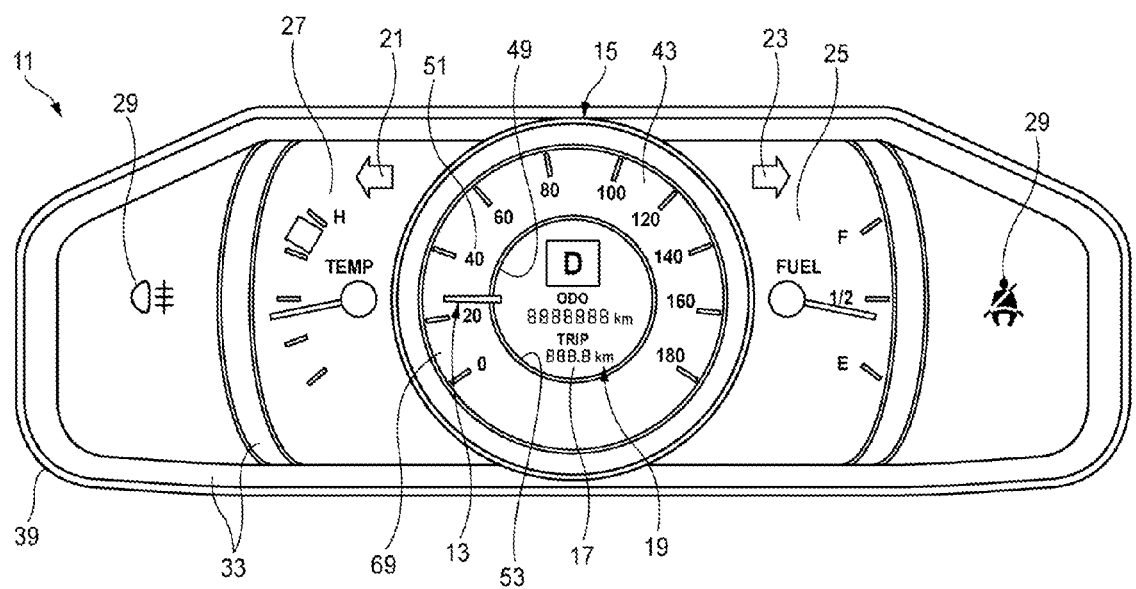
FIG. 1 is a front view of a combination meter provided with a spontaneous light pointer having a pointer structure according to one embodiment of the present invention.

As shown in FIG. 1, a pointer structure in the present embodiment is to be suitably used for a spontaneous light pointer 13 of a combination meter 11. The combination meter 11 is mounted for example in an instrument panel, not shown, of a vehicle. The combination meter 11 is arranged with a speedometer 15 for indicating a speed of a vehicle, a multi-display 19 using an LCD 17 as a display, a turn L indicator 21, a turn R indicator 23, a fuel indicator 25 for indicating a remaining amount of fuel, a water temperature indicator 27 for indicating a water temperature, and a warning light 29 for giving warning of not fastening of a seat belt or of forgetting to turn off lights.

Figure 2:
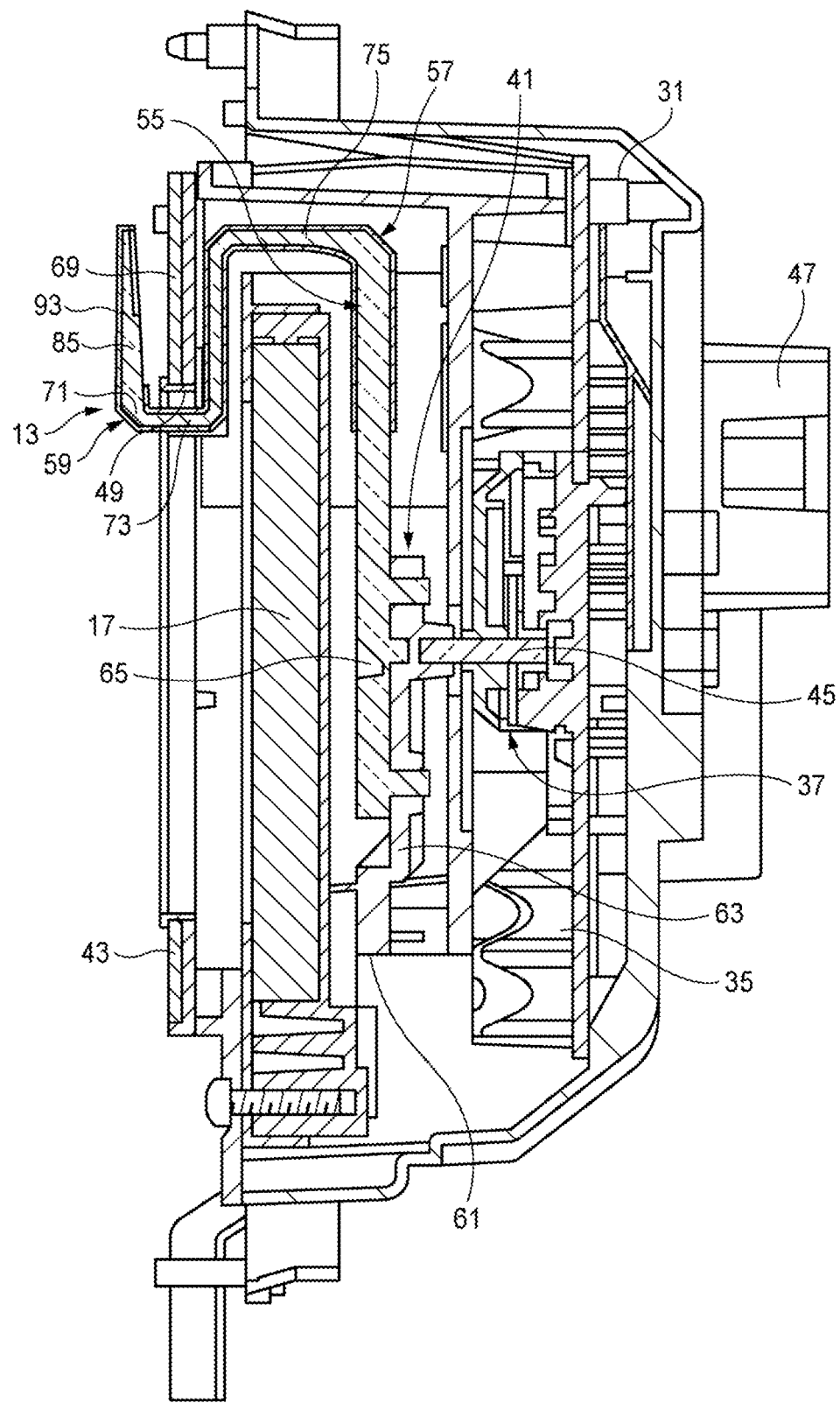
FIG. 2 is a vertical sectional view of the combination meter shown in FIG. 1.

As shown in FIG. 2, the speedometer 15, the multi-display 19, the turn L indicator 21, the turn R indicator 23, the fuel indicator 25, the water temperature indicator 27 and the warning light 29 are housed in a casing 31 of the combination meter 11. The casing 31 is attached with an inside cover 33 (see FIG. 1) at a front face thereof so that the inside cover 33 conceals those housed in the casing 31 such as a circuit board 35 and a drive section 37. A cover glass 39 is attached at a front of the casing 31.

The speedometer 15 is equipped with a spontaneous light pointer device 41. The spontaneous light pointer device 41 includes a spontaneous light pointer 13, a dial plate 43, a drive section 37 disposed behind the LCD 17, a rotating shaft 45 arranged to be rotated by the drive section 37, a circuit board 35 on which the drive section 37 is mounted, and a connector 47 for external connection of the circuit board 35 to a wire harness of a vehicle body. The dial plate 43 is formed in a doughnut form in front view having centrally a generally circular aperture 49, in which a speed scale 51 is formed along an outer periphery thereof. The LCD 17 is arranged in back of the dial plate 43 so that it can be seen from front through the aperture 49 of the dial plate 43. Namely, the LCD 17 assumes a form that is surrounded by an inner edge (edge region) 53 of the dial plate 43.

Figure 3:
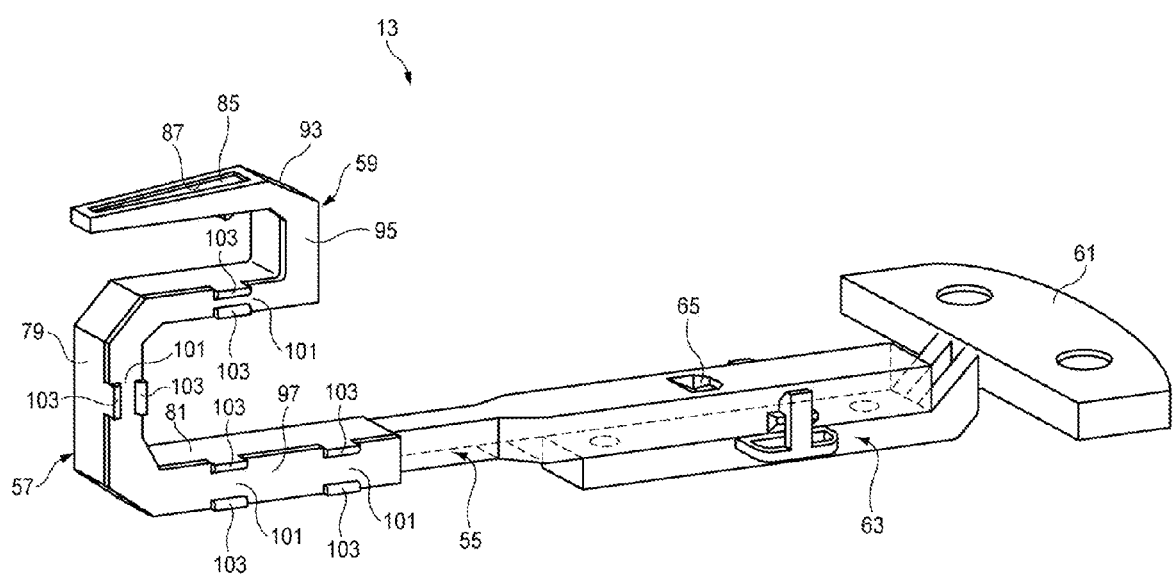
FIG. 3 is an overall perspective view of a spontaneous light pointer shown in FIG. 2.

The spontaneous light pointer 13 having a pointer structure according to the present embodiment includes a pointer main body 55, a main cover 57, a sub-cover 59 and a support 63 having a counterbalance 61, as shown in FIG. 3. The pointer main body 55 is formed with a light inlet 65 in a position closer to a base end thereof. The pointer main body 55 is formed of a transparent resin material as a light guide member capable of inputting light from a light source, not shown, and propagating it through an interior thereof. The resin material is not limitative but can employ PMMA (polymethylmethacrylate), PC (polycarbonate), PS (polystyrene), COP (cyclic olefin polymer) or the like, in respect of light transmissivity and formability. The main cover 57 and the sub-cover 59 are each formed of a light-shielding material or with a light-shielding film so that light can be blocked from exiting toward a main surface of the dial plate 43 through regions except for the window 87 referred later.

Figure 4:
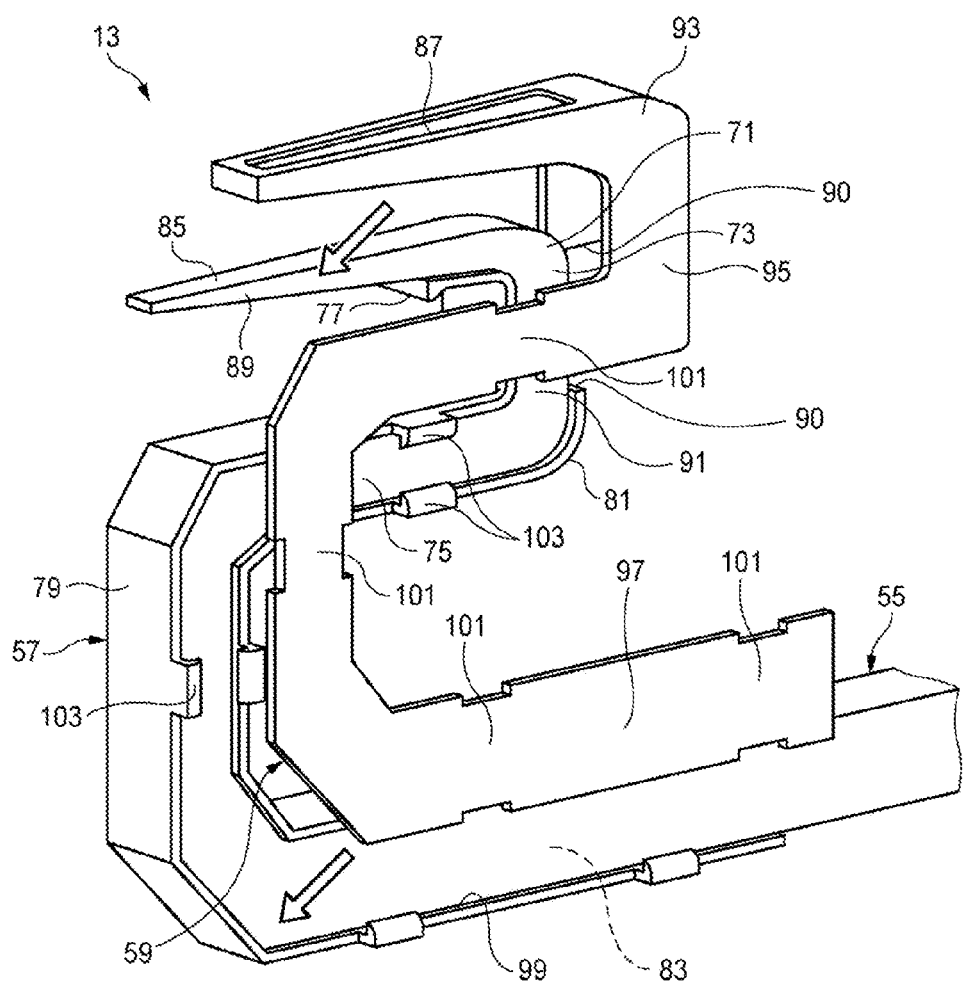
FIG. 4 is an essential-part exploded perspective view of the spontaneous light pointer shown in FIG. 3.
Figure 5A:
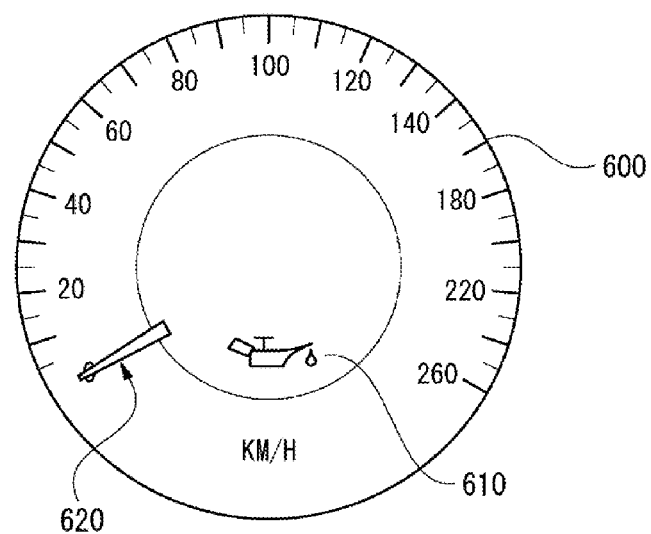
FIG. 5A is a front view showing one example of a conventional pointer device and FIG. 5B is a fragmentary sectional view of the pointer device shown in FIG. 5A.
Figure 5B:
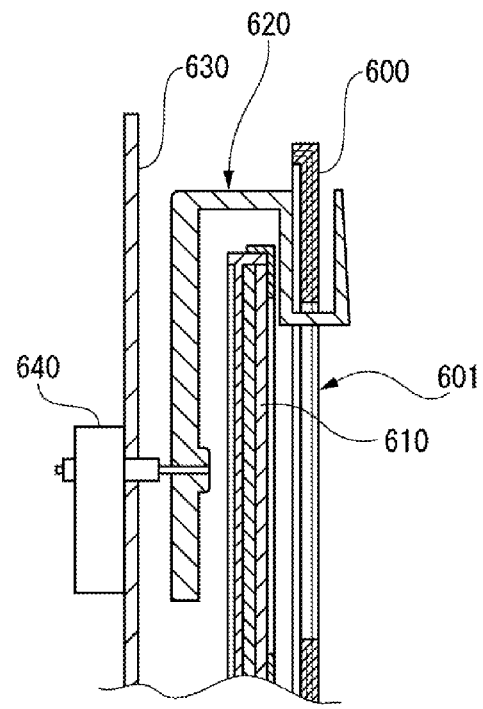

The pointer main body 55 in the present embodiment has at a tip a pointer visualizing portion 85 arranged extending along the main surface 69 of the dial plate 43. As shown in FIG. 4, the pointer main body 55 has a pointer neck portion 73 continuing to the pointer visualizing portion 85 through a pointer bend portion 71 and extending along from an inner edge 53 of the dial plate 43 to a backside of the dial plate 43. By continuing the pointer neck portion 73 with a U-shaped bend portion 75 closer to a pointer base end, the pointer main body 55 is formed in a generally S-shape in a region closer to the tip thereof. This permits the pointer visualizing portion 85 to point the speed scale 51 on the dial plate 43 arranged frontward of the LCD 17 with improved design, despite the drive section 37 lies in back of the LCD 17.

The main cover 57 in the present embodiment is formed in a trough form sandwiching the pointer main body 55 in a region closer to the pointer base end than the pointer neck portion 73, by a first sidewall 79 having a bend piece portion 77 covering an inner corner of the pointer bend portion 71 and a second sidewall 81 continuing to the first sidewall 79 through a bottom wall 83 and confronting it. As shown in FIG. 3, the main cover 57 is fitted over solely the S-shaped region of the pointer main body 55 closer to the tip thereof.

The sub-cover 59 in the present embodiment has an L-shaped cover portion 93 formed with a window 87 through which the pointer visualizing portion 85 is exposed and covering both side faces 89 of the pointer visualizing portion 85, an outer corner of the pointer bend portion 71 and both side faces 91 of the pointer neck portion 73. An L-shaped sidewall 95 covering one of the neck side faces 91 is continued with a lid portion 97 closing an opening 99 spanning between the first sidewall 79 and the second sidewall 81.

The lid portion 97 closing the opening 99 is secured to the opening 99 through a claw-engagement structure provided between the first and second sidewalls 79, 81 and the lid portion 97. In the present embodiment, the claw-engagement structure is constituted by securement regions 101 formed by narrowing part of the lid portion 97 widthwise and pairs of claws 103 protruding from first and second walls 79, 81 toward the opening 99 in a manner engaging with the securement regions 101. Alternatively, the claw-engagement structure may be provided such that claws protruding opposite from the lid portion 97 are respectively fitted with engagement holes formed in the first and second sidewalls 79, 81.

Next, the function of the pointer structure configured as above will be described.

In the pointer structure in the above embodiment, the pointer main body 55 can be covered by the two members, i.e. the main cover 57 and the sub-cover 59, so that the number of parts can be reduced.

Figure 6:
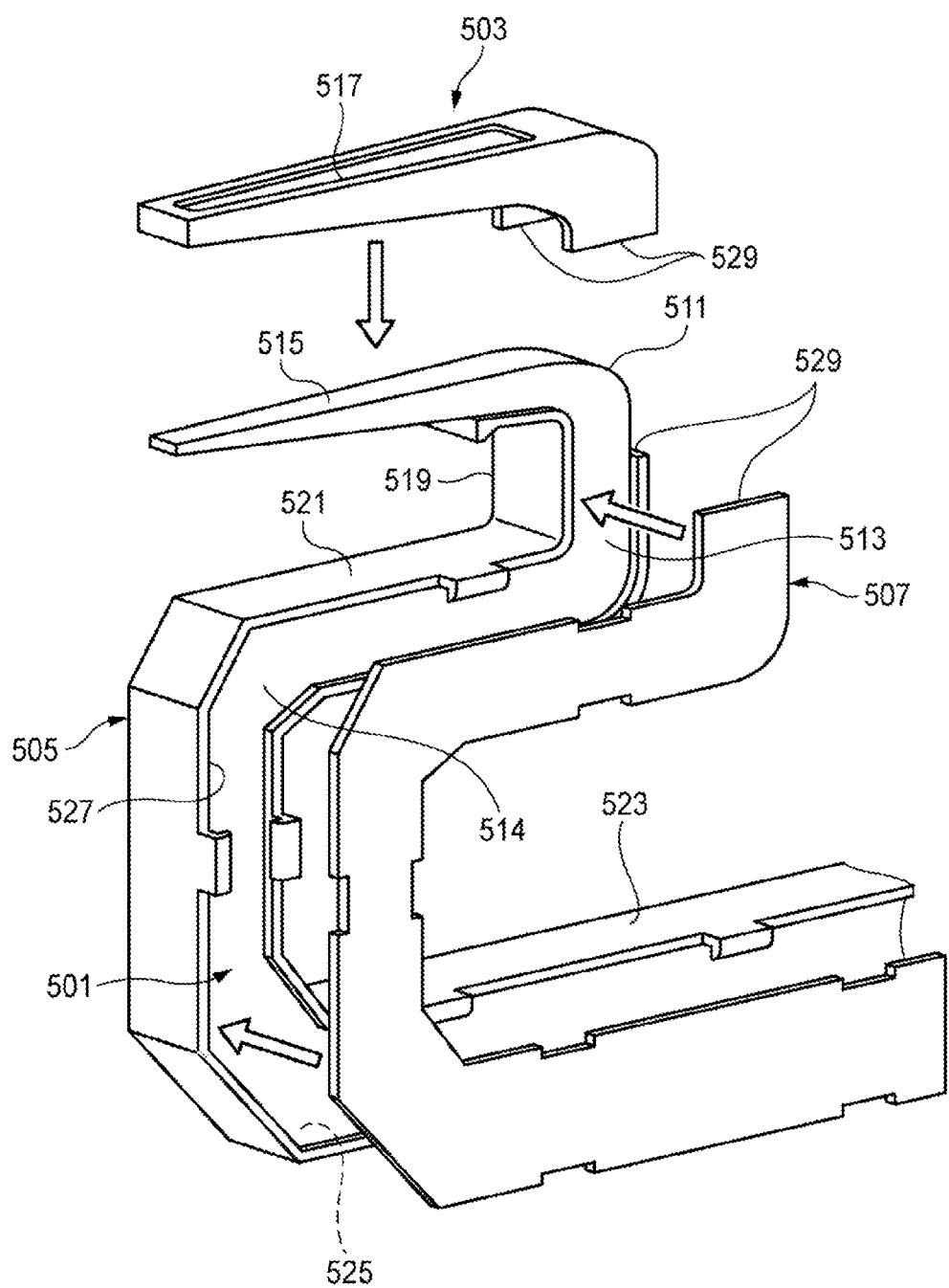
FIG. 6 is an essential-part exploded perspective view showing a reference example of a spontaneous light pointer.

Meanwhile, in the reference example shown in FIG. 6, the visualizing cover 503 and the main-body cover 505 and lid cover 507, that are provided separate, had their abutting faces 529 located frontward with respect to the dial plate. On the contrary, the L-shaped cover portion 93 in the present embodiment is formed integral with the lid portion 97 and moreover the L-shaped cover portion 93 and the main cover 57 have their abutting faces 90 located in positions backward of the dial plate 43 and closer to the pointer base end than the pointer neck portion 73, so that no leak of light occurs toward the main surface of the dial plate 43. Furthermore, design improvement can be achieved by the reduced number of abutting faces 90.

When assembled to the pointer main body 55, the main cover 57 receives the pointer main body 55 therein. Thereafter, while bringing the L-shaped cover portion 93 of the sub-cover 59 close thereto from obliquely above the bend piece portion 77, the pointer visualizing portion 85 is inserted into the L-shaped cover portion 93 from below. At the same time, the lid portion 97 continuing with the L-shaped cover portion 93 can be attached to the opening 99 spanning between the first sidewall 79 and the second sidewall 81. The sub-cover 59 can be assembled to the main cover 57 by a one-directional assembling action.

In the pointer structure in the present embodiment, the pointer visualizing portion 85 is inserted into the L-shaped cover portion 93 from below and simultaneously the lid portion 97 continuing with the L-shaped cover portion 93 is attached to the opening 99 spanning between the first sidewall 79 and the second sidewall 81. On this occasion, by pushing the lid portion 97 onto the main cover 57 while keeping a one-directional assembling action, the lid portion 97 can be easily secured to the opening 99 through the claw-engagement structure.

Therefore, according to the pointer structure in the present embodiment, assembling is possible with efficiency by a reduced number of parts while improving light-shielding characteristics and appearance.

Incidentally, the present invention is not limited to the above embodiment but can be modified, improved or so appropriately. Besides, the components in the embodiment are arbitrary and not limitative in respect of their materials, shapes, dimensions, number, arrangement points or the like as long as the present invention can be achieved.

For example, the pointer main body 55 of the spontaneous light pointer 13 in the present embodiment has a pointer neck portion 73 continuing to the pointer visualizing portion 85 through a pointer bend portion 71 and extending along from an inner edge 53 of the dial plate 43 to a backside of the dial plate 43. By continuing the pointer neck portion 73 with a U-shaped bend portion 75 closer to the base end, a generally S-shape is formed in a region closer to the tip of the pointer main body. However, the pointer structure according to the present invention is not limited to the above. Namely, a pointer main body can be configured with a generally J-shape at its tip, by providing a pointer neck portion continuing to a pointer visualizing portion through a pointer bend portion and extending along from an outer edge of a dial plate to a backside of the dial plate and by providing a straight extension continuing from the pointer neck portion closer to the pointer base end.

What is claimed is:

1. A pointer structure comprising:
a pointer main body having a pointer visualizing portion arranged along a surface of a dial plate and provided closer to a pointer tip and a pointer neck portion continuing to the pointer visualizing portion through a pointer bend portion and extending along from an edge region of the dial plate to a backside thereof;
a main cover having a first sidewall having a bend piece portion covering an inner corner of the pointer bend portion and a second sidewall continuing to and confronting the first sidewall through a bottom wall, and formed in a trough form so that the first sidewall and the second sidewall sandwich the pointer main body in a region closer to a pointer base end than the pointer neck portion; and
a sub-cover having an L-shaped cover portion formed with a window through which the pointer visualizing portion is exposed and covering both side faces of the pointer visualizing portion, an outer corner of the pointer bend portion and both side faces of the pointer neck portion, wherein the L-shaped cover portion continues with a lid portion closing an opening spanning between the first sidewall and the second sidewall.

2. A pointer structure according to claim 1, wherein the lid portion is secured to the opening through a claw-engagement structure provided between the first and second sidewalls and the lid portion.

\* \* \* \* \*